United States Patent [19]

Siefring

[11] Patent Number: 5,033,340

[45] Date of Patent: Jul. 23, 1991

[54] APPARATUS AND METHOD FOR TOOL VIBRATION DAMPING

[75] Inventor: Larry T. Siefring, Troy, Ohio

[73] Assignee: The Monarch Machine Tool Company, Sidney, Ohio

[21] Appl. No.: 469,800

[22] Filed: Jan. 22, 1990

Related U.S. Application Data

[63] Continuation of Ser. No. 256,985, Oct. 13, 1988, abandoned.

[51] Int. Cl.⁵ .............................................. B23B 29/12
[52] U.S. Cl. ....................................... 82/158; 248/630; 248/634; 248/638
[58] Field of Search ...................... 408/143; 407/9, 10; 82/76, 97, 121, 163, 36 R, 38 A, DIG. 9, 158, 159, 904; 248/630, 632, 634, 638; 267/141.1, 294

[56] References Cited

U.S. PATENT DOCUMENTS

| | | | |
|---|---|---|---|
| 3,544,415 | 12/1970 | Price | 161/44 |
| 3,663,116 | 5/1972 | Muller | 408/143 |
| 3,800,380 | 5/1974 | Cline | 29/95 R |
| 3,838,936 | 10/1974 | Andreassen | 408/143 |
| 4,278,726 | 7/1981 | Wieme | 428/229 |
| 4,447,181 | 5/1984 | Asano | 82/DIG. 9 |
| 4,491,044 | 1/1985 | Haas | 82/36 A |
| 4,744,539 | 5/1988 | Stimeling | 248/632 |

Primary Examiner—Frederick R. Schmidt
Assistant Examiner—Jack Lavinder
Attorney, Agent, or Firm—Pearne, Gordon, McCoy & Granger

[57] ABSTRACT

High frequency vibrations of a boring bar cutting tip are minimized by use of a damping sandwich of plural layers of steel and plural alternate layers of viscoelastic solid material. This damping sandwich is placed at a joint in the machine tool between the cutting tip and a tool mounting area, and is shown as being provided between a mounting face of a tool mounting block and a mounting area. The damping sandwich permits greater depth of cut, with greater inches per revolution of chip removal without any chatter for improved metal removal.

8 Claims, 3 Drawing Sheets

APPARATUS AND METHOD FOR TOOL VIBRATION DAMPING

This is a continuation of application Ser. No. 256,985, filed on Oct. 13, 1988, now abandoned.

BACKGROUND OF THE INVENTION

Vibration damping has taken many different forms. U.S. Pat. No. 3,663,116 discloses a structure intended to damp torsional vibrations in a boring bar with steel outer and inner tubular members welded together at the mounting end and separated by a layer of rubber. U.S. Pat. No. 3,838,936 discloses a boring bar holder which is adjustably damped by two axially compressible rubber spring members. U.S. Pat. No. 4,491,044 discloses a boring bar holder on a turret with a facial relief and a seal creating a closed damping chamber which may be filled with oil or with a viscoelastic material. U.S. Pat. No. 3,800,380 discloses a viscous damped cutting tool by means of a soft inner core inside the hard surface cutting tool. U.S. Pat. No. 3,544,415 discloses alternate plates of steel and relatively thick plates of rubber used as bearing pads for a bridge subject to elongation. U.S. Pat. No. 4,278,726 discloses a leaf spring formed from laminations of elastomer and rigid layers, including metal. U.S. Pat. No. 4,447,181 discloses a boring bar mount with a rubber pad compressed in a recess with metal-to-metal engagement on the mounting face surrounding the rubber pad.

SUMMARY OF THE INVENTION

The vibration damping structures of the prior art have metal-to-metal contact in the support of the tool in a direction parallel to compressive stress on the damping medium. This metal-to-metal contact transmitted to the machine tool vibrations of the cutting tool tip rather than damping such vibrations.

Accordingly, the problem to be solved is how to construct a vibration damping tool assembly for a machine tool wherein the damping medium is stressed in compression without any metal-to-metal contact of the tool mounting assembly in a direction parallel to such compressive forces.

This problem is solved by a vibration damping tool assembly for a machine tool having a mounting area comprising, in combination, securement apertures in the mounting area of the machine tool, a tool mount having securing apertures corresponding to the apertures in the machine tool, a tool holder in said tool mount and having a cutting tip, a damping sandwich of plural layers of metal and plural layers of viscoelastic solid material, and means for securing said damping sandwich between said cutting tip and the mounting area of the machine tool.

The problem may further be solved by a damped boring bar mounting assembly comprising, in combination, a metal mounting block, securement apertures through said block for securing said mounting block to a machine tool, a boring bar aperture in said mounting block to receive a boring bar, a damping sandwich of plural layers of metal and plural layers of viscoelastic solid material, said sandwich being rectangular in plan view and mounted by a layer of viscoelastic solid material to one face of said metal mounting block in an area encompassing at least part of said securement apertures, and securement means acting through said securement apertures to secure said mounting block one face to a machine tool with said damping sandwich therebetween and with absence of metal-to-metal contact between said mounting block face and the machine tool to damp high frequency vibrations of said boring bar for a smoother cut.

The problem may further be solved by a method of minimizing vibration of a cutting tool tip and imparting a smoother finish on a rotatable workpiece in a machine tool, the cutting tool tip being mounted at a removable joint to the machine tool, said method comprising establishing a damping sandwich of a plurality of relatively rigid and incompressible sheets interspersed with layers of viscoelastic material which adhere the sheets together, and securing said damping sandwich at the removable joint, with the plane of the sandwich transverse to the securing force to load the viscoelastic material in compression.

Accordingly, an object of the invention is to provide a vibration damped tool assembly for a machine tool.

Another object of the invention is to provide a vibration damped tool assembly with a damping sandwich of plural layers of rigid and plural layers of viscoelastic solid material.

Still another object of the invention is to provide a vibration damping tool assembly with the absence of metal-to-metal contact in the direction of the compressive force on the viscoelastic material.

Other objects and a fuller understanding of the invention may be had by referring to the following description and claims, taken in conjunction with the accompanying drawing.

DESCRIPTION OF THE PREFERRED EMBODIMENTS

Figure 1:
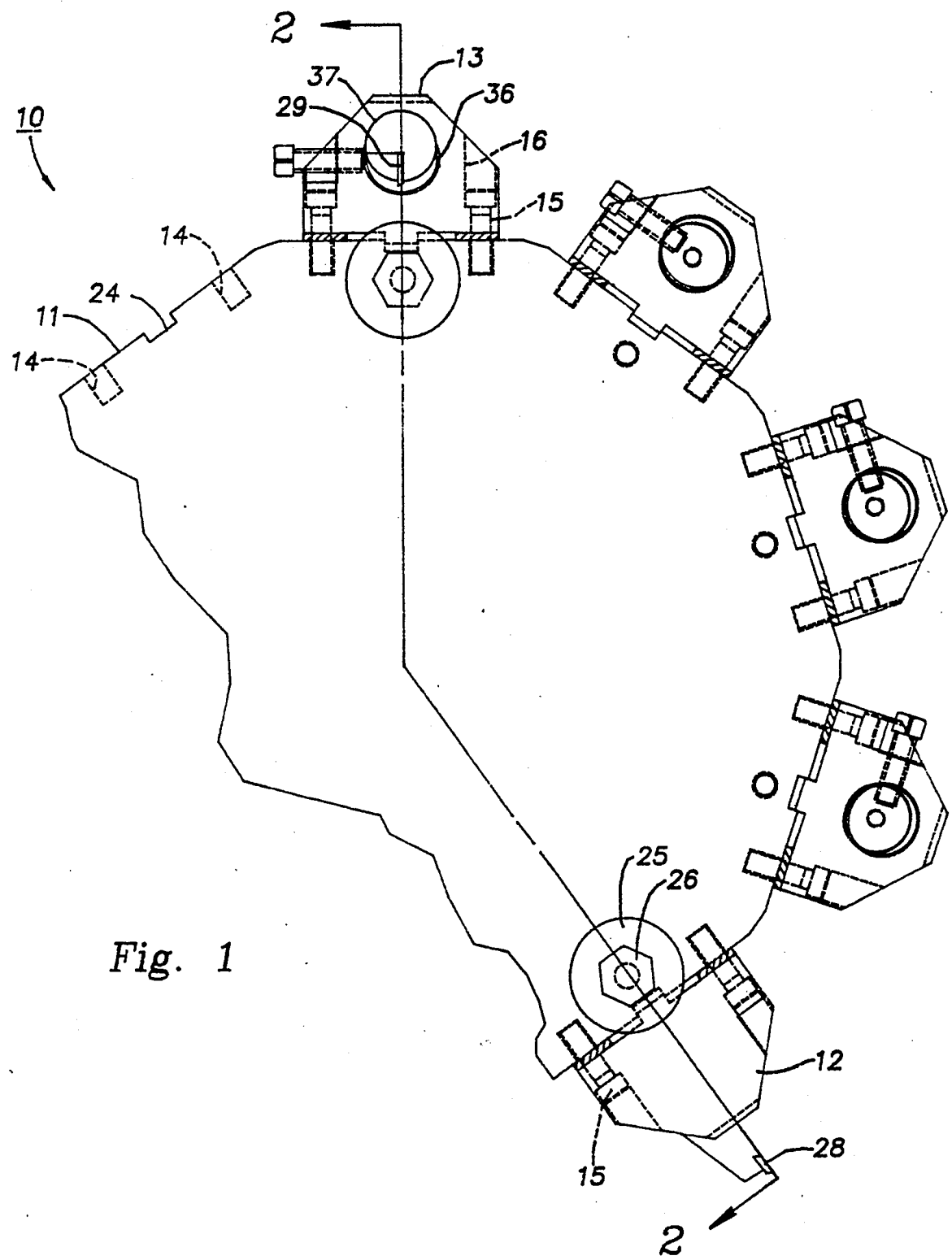
FIG. 1 is a perspective view of a machine tool turret with tool mounting assemblies embodying the invention.

FIG. 1 illustrates a portion of a machine tool 10, in this case a turret with mounting areas 11 for tool mounts 12 and 13. Securement apertures 14 are formed in the various faces of the turret 10 to receive securing screws 15 which secure the tool mounts 12 or 13 to the turret 10. Each tool mount has securing apertures 16 corresponding to the securement apertures 14.

Each tool mount 12 or 13 has a mounting face 20, a side key face 21, and an abutment face 22. The machine tool, in this case shown as the turret 10, has the mounting area 11 to receive the mounting face 20, a key way 24, and an abutment shoulder 25. Where a tool mount 12 or 13 is secured to the respective mounting area 11 by the securing screws 15, the mounting face 20 is adapted to cooperate with the mounting area 11, the side key face 21 engages the sides of the key way 24, and the abutment face 22 is in engagement with the abutment shoulder 25.

The tool mounts 12 and 13 are adapted to carry a cutting tool tip 28 and 29, respectively, which may be hardened inserts for OD turning and boring, respectively, as the turret 10 is indexed to an operative position of the cutting tool tip relative to a rotating workpiece 38, shown in phantom.

Figure 5:
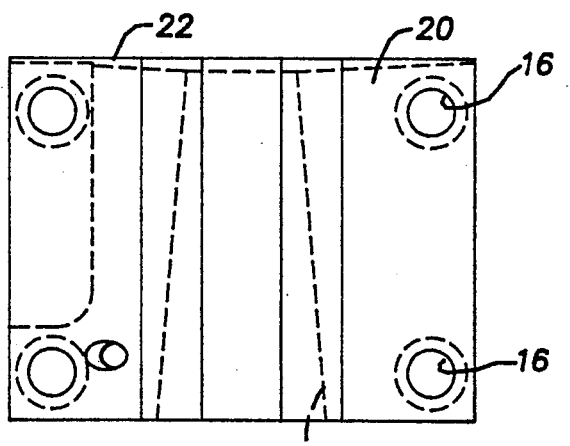
FIG. 5 is a plan view of a damping sandwich.
Figure 6:
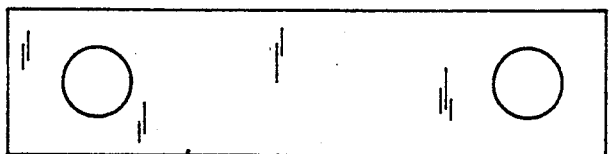
FIG. 6 is a side view of this damping sandwich.
Figure 7:

A damping sandwich 32, better shown in FIGS. 5 and 6, is provided for each tool mount 12 or 13. The damping sandwich 32 is made from a plurality of layers of relatively rigid and incompressible material, such as layers of steel 34, and a plurality of alternate layers of a viscoelastic material 35. In the preferred embodiment, there are at least three such layers of steel and two layers of viscoelastic material, and in FIG. 6, the preferred embodiment is four layers of steel and three layers of viscoelastic material which bond together the steel layers. Another viscoelastic layer bonds the sandwich to the mounting face 20. The tool mount 13, for example, has a boring bar aperture 36 receiving a boring bar 37, and the cutting tool tip 29 is mounted on the outer end of this boring bar.

Figure 2:
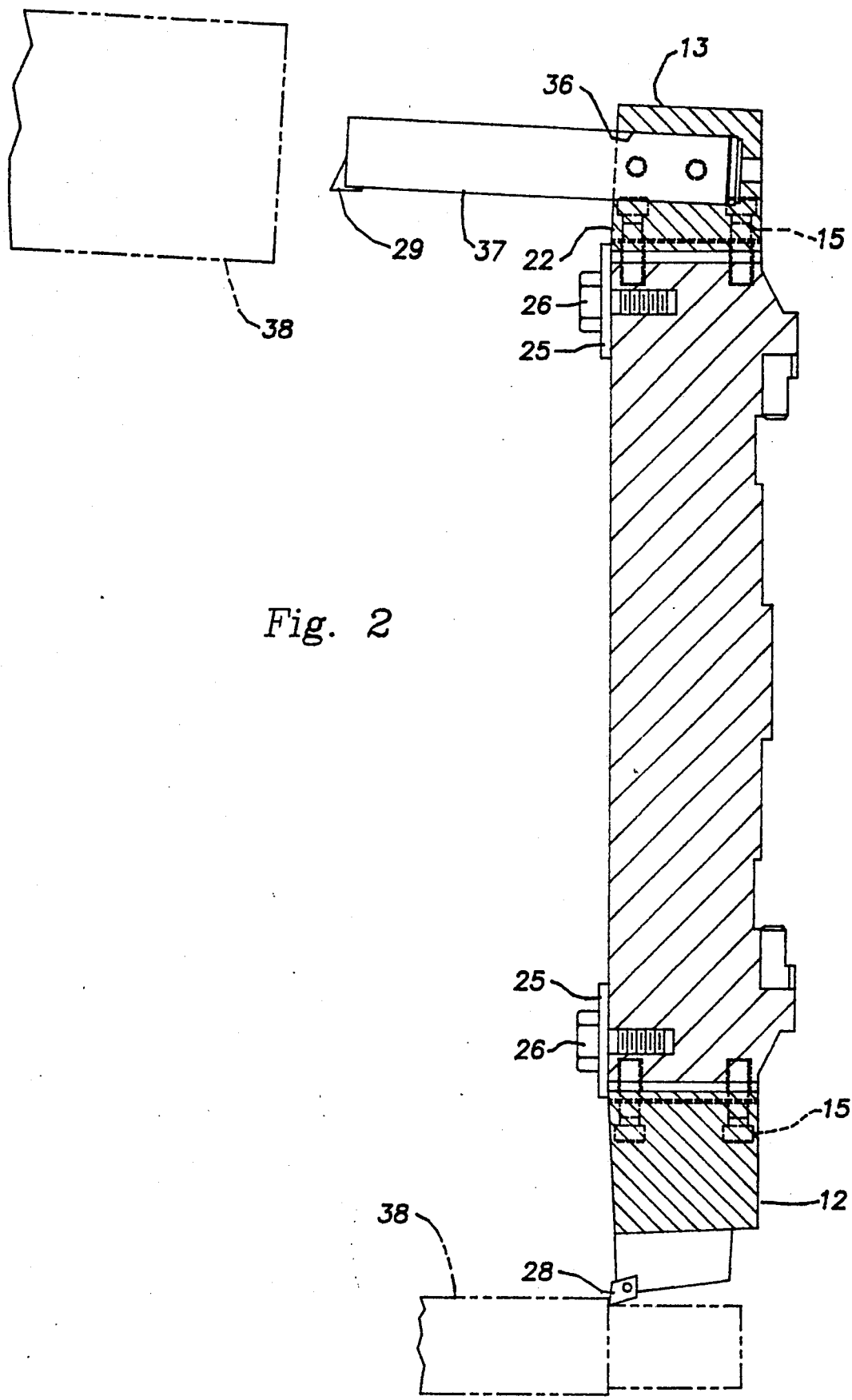
FIG. 2 is an end view of a tool mounting block embodying the invention.
Figure 3:
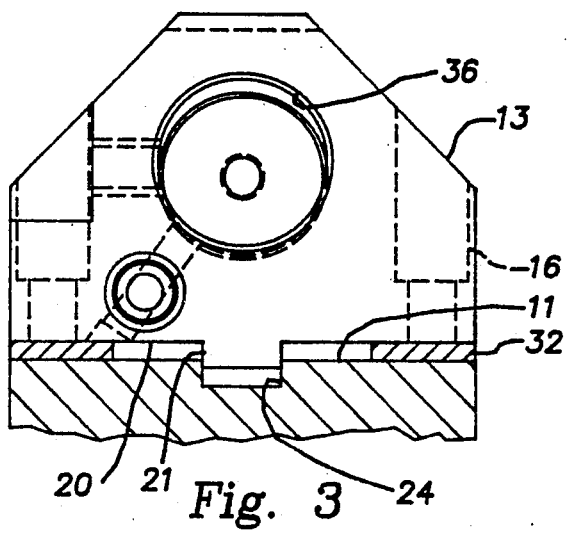
FIG. 3 is a side view of the block of FIG. 2.
Figure 4:
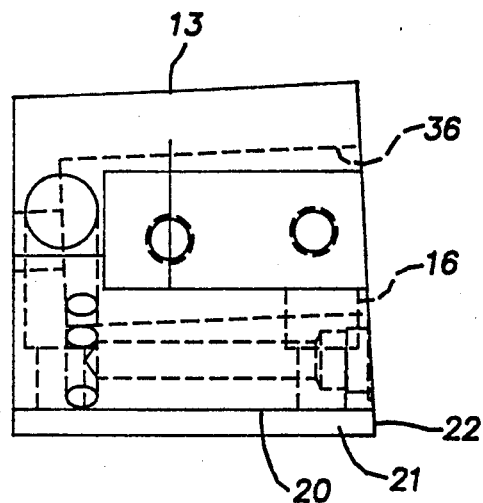
FIG. 4 is a bottom view of the block of FIG. 2.

The damping sandwich 32 is mounted somewhere between the cutting tip 29 and the turret 10. There are one or more junctions or joints between the cutting tip 29 and the turret 10, and the damping sandwich 32 is mounted at one of these junctions. In the preferred embodiment, the damping sandwich is mounted between the mounting area 11 on the turret 10 and the mounting face 20 on the tool mount 12 or 13. FIGS. 1 and 2 of the drawings show that two such damping sandwiches 32 are preferably used with each tool mount, with two of the securing screws 15 extending through securing apertures in each pair of damping sandwiches. The plane of each damping sandwich is perpendicular to the securing force of the securing screws. The underside of the heads of the securing screws 15 applies the securing force to each tool mount 12 or 13, and the damping sandwiches 32 are stressed in compression to resist this securing force. There is no metal-to-metal contact between the tool mounts 12 or 13 and the turret 10 in a direction perpendicular to or resisting this securing force. There is metal-to-metal contact in two other directions, namely, the side key face 21 engages the side of the key way 24 and the abutment face 22 engages the abutment shoulder 25. These metal-to-metal contacts provide a positive and known location of the cutting tip 28 or 29 relative to the turret 10 so that precise machining may be carried out by the machine tool. However, these metal-to-metal contacts are in a direction parallel to the securing force rather than perpendicular to it. As a result, the damping sandwich 32 is able to damp vibrations of the cantilever-mounted tool tip 28 or 29 for a considerably smoother finish on the workpiece 38. The damping sandwich 32 has been found especially advantageous to damp higher frequency vibrations. The machine tool with which the invention has been used was statically quite stiff, but dynamically not so stiff because of the elimination of many of the previously used various joints which did damp some of the vibrations. The plurality of alternating layers of viscoelastic solid material produced excellent results in the elimination of this chatter or vibration which showed up as a form of knurling on the workpiece 38. By so eliminating the vibration and improving the surface finish on the workpiece, this permits a greatly improved metal removal rate for less machining time.

The following six Tables show test results of various cuts made with boring bars, such as the boring bar 37. All cutting was done on 771M steel, which is a pre-heat-treated 4140 steel having a hardness of 28-32 Rockwell C and a machinability index of 75%.

TABLE 1

Standard Holder with 1½" Bar Extended 4:1
Insert CNMG 433E, 560 Grade Carboloy

| SFM | IPR | Depth of Cut | Remarks |
| --- | --- | --- | --- |
| 800 | .007 | .03 | Chatter |
| 600 | .010 | .05 | Chatter |
| 400 | .012 | .10 | Chatter |
| 400 | .012 | .20 | Chatter |

TABLE 2

Holder with Three-Joint Shim, 1½" Diameter
Bar Extended 4:1
Insert CNMG 433E, 560 Grade

| SFM | IPR | Depth of Cut | Remarks |
| --- | --- | --- | --- |
| 800 | .007 | .03 | Good |
| 600 | .010 | .05 | Good |
| 500 | .012 | .10 | Good |
| 500 | .012 | .20 | Good (poor finish) |
| 500 | .015 | .20 | Good (poor finish) |

TABLE 3

Standard Holder with 2½" Diameter Bar Extended 4:1
Insert TNG 432

| SFM | IPR | Depth of Cut | Remarks |
| --- | --- | --- | --- |
| 800 | .007 | .03 | Chatter |
| 600 | .010 | .05 | Chatter |
| 400 | .010 | .10 | Chatter |
| 400 | .012 | .15 | Chatter |

TABLE 4

Holder with Three-Joint Shim, 2½" Bar Extended 4:1
Insert TNG 432

| SFM | IPR | Depth of Cut | Remarks |
| --- | --- | --- | --- |
| 800 | .004 | .005 | Good |
| 800 | .007 | .030 | Good |
| 600 | .007 | .050 | Good |
| 400 | .010 | .100 | Good |
| 400 | .012 | .150 | Good |
| 400 | .012 | .200 | Good |
| 400 | .012 | .250 | Good |
| 400 | .012 | .400 | Good |
| 450 | .015 | .500 | Good |
| 450 | .020 | .500 | Good |

TABLE 5

Standard Holder with 2" Diameter Bar Extended 4:1
Insert CNMG 542

| SFM | IPR | Depth of Cut | Remarks |
| --- | --- | --- | --- |
| 800 | .007 | .03 | Chatter |
| 600 | .010 | .05 | Chatter |
| 400 | .010 | .10 | Chatter |
| 400 | .012 | .20 | Chatter |

TABLE 6

Holder with Three-Joint Shim, 2" Bar Extended 4:1
Insert CNMG 542

| SFM | IPR | Depth of Cut | Remarks |
| --- | --- | --- | --- |
| 800 | .004 | .03 | Good |
| 800 | .007 | .03 | Good |
| 600 | .010 | .05 | Good |
| 400 | .012 | .10 | Good |
| 400 | .012 | .20 | Good |
| 400 | .015 | .40 | Good |

TABLE 6-continued

Holder with Three-Joint Shim, 2" Bar Extended 4:1 Insert CNMG 542

| SFM | IPR | Depth of Cut | Remarks |
|---|---|---|---|
| 400 | .020 | .50 | Chatter |

The damping sandwich 32 was constructed in several different variations. The preferred embodiment shown in FIGS. 5 and 6 was with steel sheets of 16 gauge steel bonded together with an adhesive layer of approximately 0.005 inch thickness. Each steel layer was approximately 0.059 inch. After bonding and curing, the damping sandwich was machined, such as by surface grinding, to obtain a finished damping sandwich of precise thickness, e.g., 0.250 inch thickness. With this precise thickness, the precise location of the cutting tool 10 may be determined and maintained. For one particular application, each damping sandwich 32 was five inches long and 1.2 inches wide. This gave a large area to resist the compression forces. The total forces on the viscoelastic material include the securing force of the securing screws 15 and the cutting force, which may be partly in compression or tension and partly in shear. The viscoelastic material is a form of adhesive which bonds together the rigid sheets 34 and, because of the large area and thin layer 35, the compressive strength of the viscoelastic material 35 is greater than the securing force or combined securing and cutting tool force. In this manner, the damping sandwich 32 provides a stable platform for the cutting tip 28 or 29. As shown in Tables 2, 4, and 6, the use of the present invention permits much greater inches per revolution and greater depth of cut to be performed on the workpiece 38 without any chatter compared to the prior art shown in Tables 1, 3, and 5.

The viscoelastic solid material 35 is a material which adheres together the solid sheets 34. The preferred embodiment is an anaerobic cure dimethacrylate resin which cures into a flexible polyacrylate resin. A suitable resin of this material is sold as Loctite 515 gasket eliminator sealant. It cures in contact with most metals without any solvent evaporation, cracking, or shrinking.

It will be noted that the present construction provides a method of minimizing vibration of a cutting tool tip and imparting a smoother finish on a rotatable workpiece in a machine tool. This is accomplished by the vibration damping tool assembly disclosed herein, and specifically by the damped boring bar mounting assembly. The substantially rigid and incompressible sheets 34 are metal sheets, such as sheet steel, in the range of 0.025 to 0.100 inch thick. Both three and four layers of these steel sheets have been tried, with equally good results. The layers of viscoelastic material are each in a range of 0.003 to 0.015 inch in thickness, and two or three such layers of material 35 have been tried. Such damping sandwiches 32 prevent metal-to-metal contact between the mounting face 20 of the tool mount 12 or 13 and the turret mounting area 11. The absence of any such metal-to-metal contact has been found to successfully damp the vibrations, especially the higher frequency vibrations which gave chatter to the tool tip and a resultant poor finish on the workpiece 38. This is a considerable improvement over the prior art, which did have metal-to-metal contact between the tool mounting face and the mounting area on the machine tool, and which did transmit such tool tip vibrations.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A damped cutting tool mounting assembly comprising, in combination:
   a metal mounting block;
   securement apertures through said block for securing said mounting block to a machine tool;
   an aperture in said mounting block to receive a cutting tool;
   a generally planar damping sandwich of plural layers of metal and plural layers of viscoelastic solid material;
   said sandwich being generally rectangular in plan view and mounted by a layer of viscoelastic solid material to one face of said metal mounting block in an area encompassing at least part of said securement apertures;
   metal locating surface means on said mounting block for direct contact with complimentary locating surface means on said machine tool, said locating surface means each lying in planes perpendicular to said damping sandwich and providing by their metal-to-metal contact a positive fixed location of the cutting tool by preventing any lateral movement in the plane of the damping sandwich while allowing limited vibrational damping movement in a direction perpendicular to the plane of the damping sandwich; and
   securement means acting through said securement apertures with tensile forces to secure said mounting block face to a machine tool with said damping sandwich therebetween and with absence of metal-to-metal contact in compression between said mounting block face and the machine tool across at least two of said layers throughout the plane of the damping sandwich to damp high frequency vibrations of said cutting tool for a smoother cut.

2. The cutting tool mounting assembly as set forth in claim 1, wherein said metal layers are metal sheets each in the range of 0.025 to 0.100 inch thick.

3. The cutting tool mounting assembly as set forth in claim 1, wherein said layers of viscoelastic material are each in the range of 0.003 to 0.015 inch thick.

4. The cutting tool mounting assembly as set forth in claim 1, wherein said layers of viscoelastic material are three or more.

5. A method of minimizing vibration of a cutting tool tip and imparting a smoother finish on a rotatable workpiece in a machine tool, the cutting tool tip being mounted at a removable joint to the machine tool, said method comprising:
   establishing a damping sandwich in a plane formed of a plurality of relatively rigid and incompressible sheets interspersed with layers of viscoelastic material which adhere the sheets together and which have a limited compression strength;
   securing said damping sandwich at the removable joint with tensile stressed elements providing a securing force, with the plane of the sandwich transverse to the securing forces to load the viscoelastic material in compression, and with an absence of metal-to-metal contact in compression at the removable joint across at least a pair of said sheets and layers between said cutting tool tip and said machine tool in a direction perpendicular to said securing force; and providing a metal-to-metal contact at the removable joint in a direction parallel to said securing force to establish positive location of the position of the cutting tool tip by preventing any lateral movement in the plane of the damping sandwich while allowing limited vibrational damping movement in the direction parallel to the securing force.

6. The method as set forth in claim 5 wherein said securing force is on a tool mount at said joint and loads said viscoelastic material in compression.

7. The method as set forth in claim 5, wherein said compression load on said damping sandwich is less than the compression strength of said viscoelastic layers.

8. The method as set forth in claim 5 wherein said relatively rigid and incompressible sheets are metal sheets.

* * * * *